(12) United States Patent
Mansfield et al.

(10) Patent No.: US 7,974,569 B2
(45) Date of Patent: Jul. 5, 2011

(54) METHOD AND APPARATUS FOR CUSTOMIZING LESSON PLANS

(75) Inventors: Renee Carolyn Mansfield, Uxbridge, MA (US); Laura Larsen Dudley, Westwood, MA (US); Karen Theresa DeGregory, Sudbury, MA (US); Katherine Elizabeth Foster, North Easton, MA (US)

(73) Assignee: The New England Center for Children, Inc., Southborough, MA (US)

( * ) Notice: Subject to any disclaimer, the term of this patent is extended or adjusted under 35 U.S.C. 154(b) by 1111 days.

(21) Appl. No.: 10/991,133

(22) Filed: Nov. 17, 2004

(65) Prior Publication Data

US 2006/0105313 A1 May 18, 2006

(51) Int. Cl.
*G09B 3/00* (2006.01)
(52) U.S. Cl. ..................................................... 434/350
(58) Field of Classification Search .................... 434/350
See application file for complete search history.

(56) References Cited

U.S. PATENT DOCUMENTS 5,387,104 A * 2/1995 Corder ........................... 704/270
5,788,508 A * 8/1998 Lee et al. ....................... 434/350
2001/0018178 A1 * 8/2001 Siefert ........................... 434/322
2004/0115596 A1 * 6/2004 Snyder et al. ................. 434/118
2004/0161728 A1 * 8/2004 Benevento et al. ........... 434/118

OTHER PUBLICATIONS

"CANELA Software—Education Products", http://www.canelasoftware.com/products.html, downloaded, Jun. 15, 2004 (3 pp.).
CANELA Software—FAQs, http://www.canelasoftware.com/faq.html, downloaded Jun. 15, 2004 (3 pp.).

* cited by examiner

*Primary Examiner* — Xuan M Thai
*Assistant Examiner* — Evan R Page
(74) *Attorney, Agent, or Firm* — Hamilton, Brook, Smith & Reynolds, P.C.

(57) ABSTRACT

Computer method and apparatus enable customization of lesson plans per student. The invention method and apparatus include a curriculum data store holding a plurality of curriculum records, a student record data store and a processor routine coupled to the student record data store and the curriculum data store. Each curriculum record indicates a respective teaching activity and implementation details of the activity as part of a lesson plan. There are different activities for different domains. The processor routine enables, for a given student, educator-user selection of a curriculum record with its respective activity, as a function of assessed skill level in a subject domain and/or learning profile of the student. The processor routine generates a custom lesson plan, for the given student, that includes the activity of the user-selected curriculum record. The processor routine may suspend or otherwise hold the custom lesson plan pending supervisory review at various times.

32 Claims, 12 Drawing Sheets

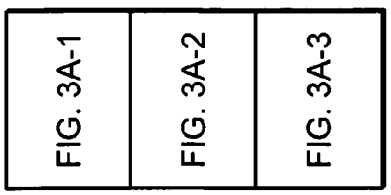

Active: 1/14/2004 9:42:24 AM    Abercrombie, Fitch    Approved:^rm    2/25/2004

| Receptive id of pictures | Across 2 people and 2 settings, and 3 instruction types, given an array of 3 pictures, the student identifies the named picture in 8 out of 9 opportunities. |

Links to Mass Frameworks: ELA_Language;

| Materials Targeted visual stimuli (3 exemplars of each comparison stimulus) comparison boards, data sheets, student specific reinforcers. | Suggested Prerequisites Session behavior. Students must demonstrate identity matching with all visual stimuli used in arbitrary match to sample training. See attached test for identity matching. |

*Initial Assessment*
Sit at table across from student. Establish attending. Present auditory sample ("X") Lay out comparison stimuli and say "X" (auditory sample) immediately point to S+ for first 3 trials (pretest only). Repeat the auditory sample every 2 seconds until the student responds or 5 seconds have elapsed since comparison presentation without a student response. Record + for correct response, - for incorrect response, and NR for no response. Reinforce correct response if fewer than 8 of 9 responses. Run one session if fewer than 8 of 9 correct, begin training. No demonstration trials on posttest.

*Baseline*
See initial assessment.

*Criteria to Increase Step:*
8 out of 9 correct (+, +p) for 2 full blocks of trials at any prompt level
*Criteria to Decrease Step:*
2 consecutive errors (-, -p, NR) at prescribed step or 3 total errors within a block of trials = discontinue data for that block of trials. Begin a new block of trials at previous step.
*Criteria to Increase Level:*
8 out of 9 correct unprompted responses (+) for 2 consecutive full blocks of trials across 2 people.
*Criteria for Help/Revision:*
3 errors (-, -p, NR) at step 0, OR no correct unprompted responses at highest step, OR no progression to next step within 5 blocks of trials = discontinue running program and notify supervisor within 3 days.
*Correction Procedure*
If NR: Remove stimuli and present next trial. If - or -p: remove stimuli and eye contact for 5 seconds and record error; re-present trial at step 0. Reinforce correct response (no data recorded)
*Criteria for Mastery:*
8 out of 9 correct for 2 consecutive full blocks of trials.
*Reinforcement Schedule:*
FR1 for correct response

| FIG. 3B-1 |
| FIG. 3B-2 |

⟋19

Generalization: Generalization to a second person or setting is prescribed within the levels of this program.
Maintenance: Run 1 time per week.

Receptive id of pictures: Across 2 people and 2 settings, and 3 instruction types, given an array of 3 pictures, the student identifies the named picture in 8 out of 9 opportunities.

| Level | Name | Description | Child Behavior |
|---|---|---|---|
| 1 | Auditory visual match to sample 1 S+ and 2 S- | Exemplar sets (ex1, ex2, and ex3) are rotated across sessions. Note specific set on datasheet. Teacher sits across from student and says "X". Lay out comparison stimuli and say "X". Repeat auditory sample every 2 seconds (steps 3-5) and when pointing to the S+ For all levels, prompt first 3 trials at step 0 for the first session of each day. Follow through steps as student meets criteria.<br><br>Step 0: Immediate point cue<br>Step 1: 1 sec delay<br>Step 2: 2 sec delay<br>Step 3: 3 sec delay<br>Step 4: 4 sec delay<br>Step 5: 5 sec delay | Isolated finger of one hand makes contact with one correct comparison stimulus and then releases contact and does not touch a second comparison stimulus in that trial. |

FIG. 3B-1

| | | |
|---|---|---|
| | | Isolated finger of one hand makes contact with one correct comparison stimulus and then releases contact and does not touch a second comparison stimulus in that trial. |
| 2 | Auditory visual match to sample 1 S+ and 2 S-, in second setting | Baseline prior to running this level. Exemplar sets (ex1, ex2, and ex3) are rotated across sessions. Note specific set on datasheet. Teacher sits across from student and says "X". Lay out comparison stimuli and say "X" Repeat auditory sample every 2 seconds (steps 3-5) and when pointing to the S+ For all levels, prompt first 3 trials at step 0 for the first session of each day. Follow through steps as student meets criteria. |

FIG. 3B-2

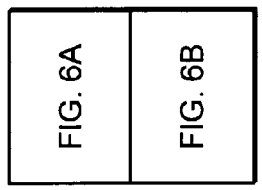

Student: Abercrombie, Fitch  2/25/2004 10:01 AM

User's Guide

| Receptive id of pictures | Across 2 people and 2 setting, and 3 instruction types, given an array of 3 pictures, the student identifies the named picture in 8 out of 9 opportunities. |
|---|---|

Close

Stimuli:

| Level. Task | Description | Instruction | Response | Data Introduced | Trials to Mastery | Date of Mastery |
|---|---|---|---|---|---|---|
| 1.00 | Auditory visual match to sample 1 S+ and S- | | | | | |
| 1.01 | | Auditory: ball | Touch ball | 1/14/2004 | 150 | 2/24/2004 |
| 1.02 | | Auditory: cup | Touch cup | 1/14/2004 | 150 | 2/24/2004 |
| 1.03 | | Auditory: fork | Touch fork | 1/14/2004 | 150 | 2/24/2004 |
| 1.04 | | Auditory: comb | Touch comb | | 0 | |

| | | | |
|---|---|---|---|
| 1.05 | | Auditory: crayon | Touch crayon | |
| 1.06 | | Auditory: apple | Touch apple | 0 |
| 1.07 | | Auditory: book | Touch book | 0 |
| 1.08 | | Auditory: soda | Touch soda | 0 |
| 1.09 | | Auditory: blocks | Touch blocks | 0 |
| 1.10 | | Auditory: toothpaste | Touch toothpaste | 0 |
| 2.00 | Auditory visual match to sample 1 S+ and 2 S-, in second setting | | | |
| 2.01 | | Auditory: ball | Touch ball | 0 |
| 2.02 | | Auditory: cup | Touch cup | 0 |
| 2.03 | | Auditory: fork | Touch fork | 0 |
| 2.04 | | Auditory: comb | Touch comb | 0 |
| 2.05 | | Auditory: crayon | Touch crayon | 0 |

FIG. 6B

METHOD AND APPARATUS FOR CUSTOMIZING LESSON PLANS

BACKGROUND OF THE INVENTION

In the field of education, general lesson plans are used to guide a teacher's classroom instruction. In public schools or government-funded education programs, a state department defines the standards and curriculum guidelines to be followed. At the next level down in the education system, the local administration/board of education specifies age appropriate curriculum and particulars that meet the state minimum standard guidelines. Each teacher then creates lesson plans that satisfy the curriculum set forth by the local administration.

In specialized school programs, lesson plans need to be customized per student, and if the school program is federally funded, lesson plans need to meet governmental requirements in terms of curriculum standards. Each student who is eligible for special education services is required to have an Individual Education Program (IEP). An example of such customization is at a publicly-funded school for learning disabled children. Although there are state and federal guidelines, there is a lack of curriculum for carrying out said guidelines.

Further, for a given student, there is added administrative/reporting overhead in creating customized lesson plans. This is compounded across different students where a school customizes lesson plans for each student and no two students have the same set of lesson plans. There is a need for an improved process of customizing lesson plans of students and reporting of the same.

Generally speaking, automated systems for generating lectures or lesson plans exist. Examples are:
U.S. Pat. No. 5,601,436 to Sudman et al.,
U.S. Pat. No. 6,516,340 to Boys,
U.S. Pat. No. 6,533,583 to Sportelli,
U.S. Pat. No. 6,537,073 to Zhang,
U.S. Patent Application No. 2003/0236796 to Easter et al.,
U.S. Patent Application No. 2004/0081953 A1 to Murphy,
U.S. Patent Application No. 2004/0107413 A1 to Bixler, and
"Lesson Plan Generator" and other educator products by Canela Software (see Canela Software.com website).

However, none of these systems are specific to any certain type of student or learning disability and none address student specific (or custom per student) lesson planning. In addition, these systems do not guide a teacher through assessment, customization per individual student and/or reporting.

SUMMARY OF THE INVENTION

The present invention provides a method and system that overcomes the problems of the prior art. The present invention especially addresses individuals with autism or similar learning profiles in which the individual learns skills in one area at different rates than skills in other areas. This is known as "splinter skills". In particular, the present invention enables the generation of lesson plans that are individualized (or customized) per student and that address the development of the whole person (socially, emotionally, physical health/hygiene wise, etc . . . as well as academically) from childhood to adulthood. To accomplish this, the lesson plans of the present invention teach various sets of skills in the areas of communication, academics, social skills, leisure/recreation, vocational, self help, health and behavior to decrease (i.e., maladaptive behavior to reduce). These category areas are herein termed "domains".

For a given domain, there are respective sets of age appropriate skills (e.g., one set of skills for children, another set of skills for adults, etc.). In a preferred embodiment, the present invention identifies a core set of skills, in each domain, necessary for independent functioning of the student. This depends, in part, on the age of the student and on the development level of the student in the subject domain. Different lesson plans assist with the development of different skills in the subject domain. For a given skill, a series of lesson plans provide introduction, practice and mastery of the skill. Thus the lesson plans of the present invention teach a skill along a continuum from teaching prerequisite skills to mastery of the skill at the appropriate age level.

Accordingly, the domains, corresponding sets of skills and continuum series of lesson plans of the present invention enable teachers and administrators alike to create individualized, growth and development programs for learning disabled individuals. In particular, the present invention recognizes that the individual with autism may learn different skill areas at different rates. For example, an autistic student may have a third grade reading ability but does not know how to tie his shoes. Thus the present invention is directed to whole person development from preschool to adulthood topics (lessons) in each of the domains but in a manner that allows for varying rates of learning across the domains (accommodates different rates in different domains).

In one embodiment, computer apparatus of the present invention includes a curriculum data store, a student information module and a processor routine coupled to the curriculum data store and student information module. Each record in the curriculum data store indicates a respective teaching activity with implementation details (step by step instructions) for use as part of a lesson plan. Alternative implementations with corresponding step by step instructions for carrying out the teaching activity are also indicated.

The student information module provides, for each student, indications of assessed skill level in each domain area and learning profile (including historical development/learning pattern and observed preferences). In a preferred embodiment, an initial skill assessment and on-going assessments are employed in forming the student's assessed skill level. Indications of student performance across past and current lesson plans and student performance within each teaching session (trial) provide a running history of skill development of the student in the student information module.

The processor routine determines, for a subject student, a subset of teaching activities in the curriculum data store as a function of assessed skill level per domain area of the subject student as indicated by the student information module. The processor routine enables an educator-user to select at least one of the teaching activities from the determined subset and generates therefrom a custom lesson plan for teaching the subject student.

Further, the processor routine enables the educator-user to view student information (e.g., learning profile, history of skill development, etc.) of a given student during selection of a curriculum record (teaching activity) from the curriculum data store in generating custom lesson plans for a student. Thus, the present invention enables the educator-user to be guided by the student information when selecting among teaching activity implementation alternatives for lesson plans. That is, the present invention enables the educator-user to make a determination of which implementation best suits the given student's learning preference (or style) per domain area. Such provides highly customized and individualized lesson plans per student where the generated custom lesson plan for the student includes the implementation of the teaching activity that the educator-user has selected as best matching the student's learning profile.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3a-3b illustrate a curriculum sheet used by the teacher to carry out a day's lesson or exercise unit.

FIG. 6 is an illustration of a table of a student record in the embodiment of FIGS. 4a and 4b.

DETAILED DESCRIPTION OF THE INVENTION

Figure 1:
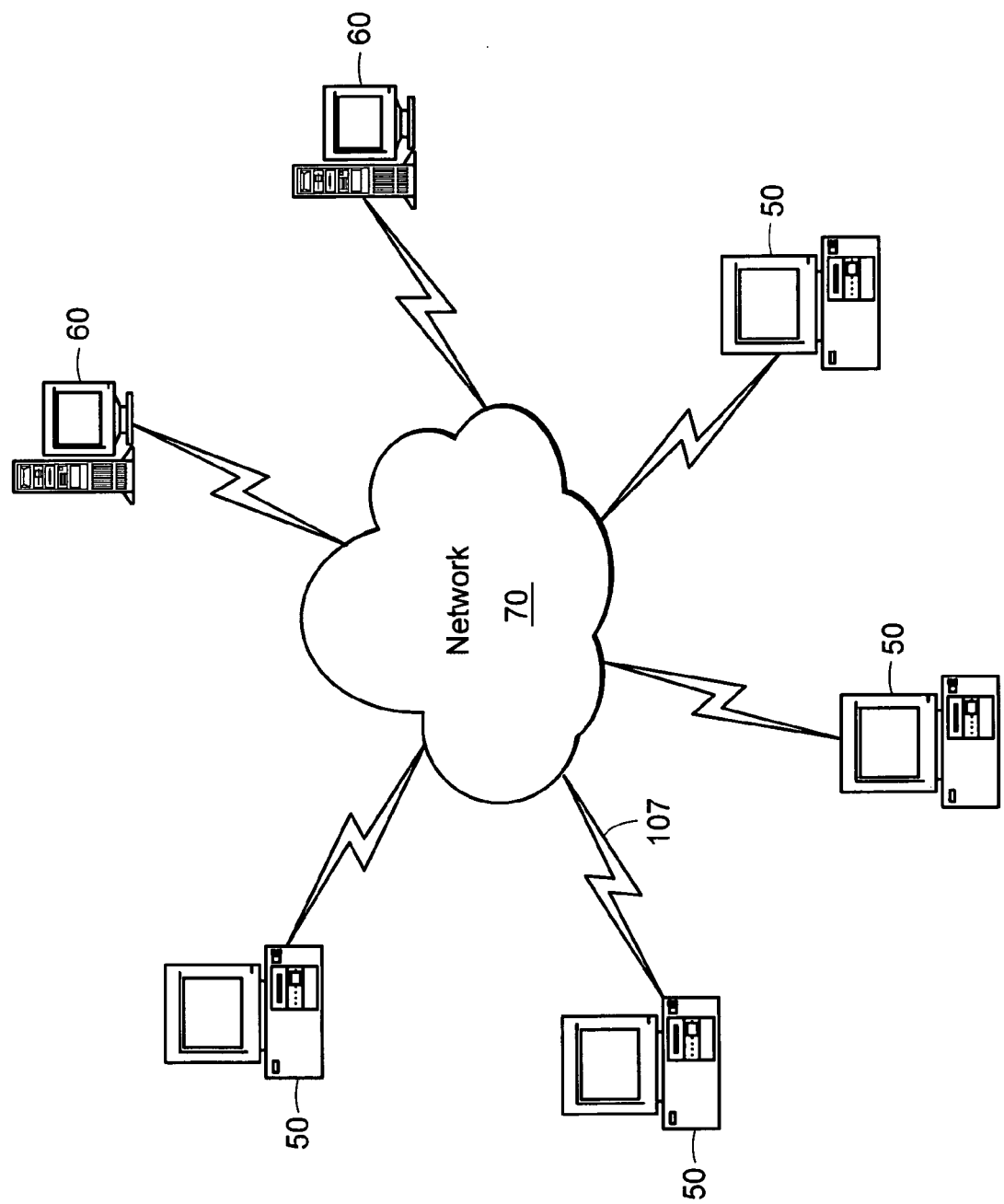
FIG. 1 is a schematic illustration of a computer network environment in which embodiments of the present invention may be practiced.

FIG. 1 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 2:
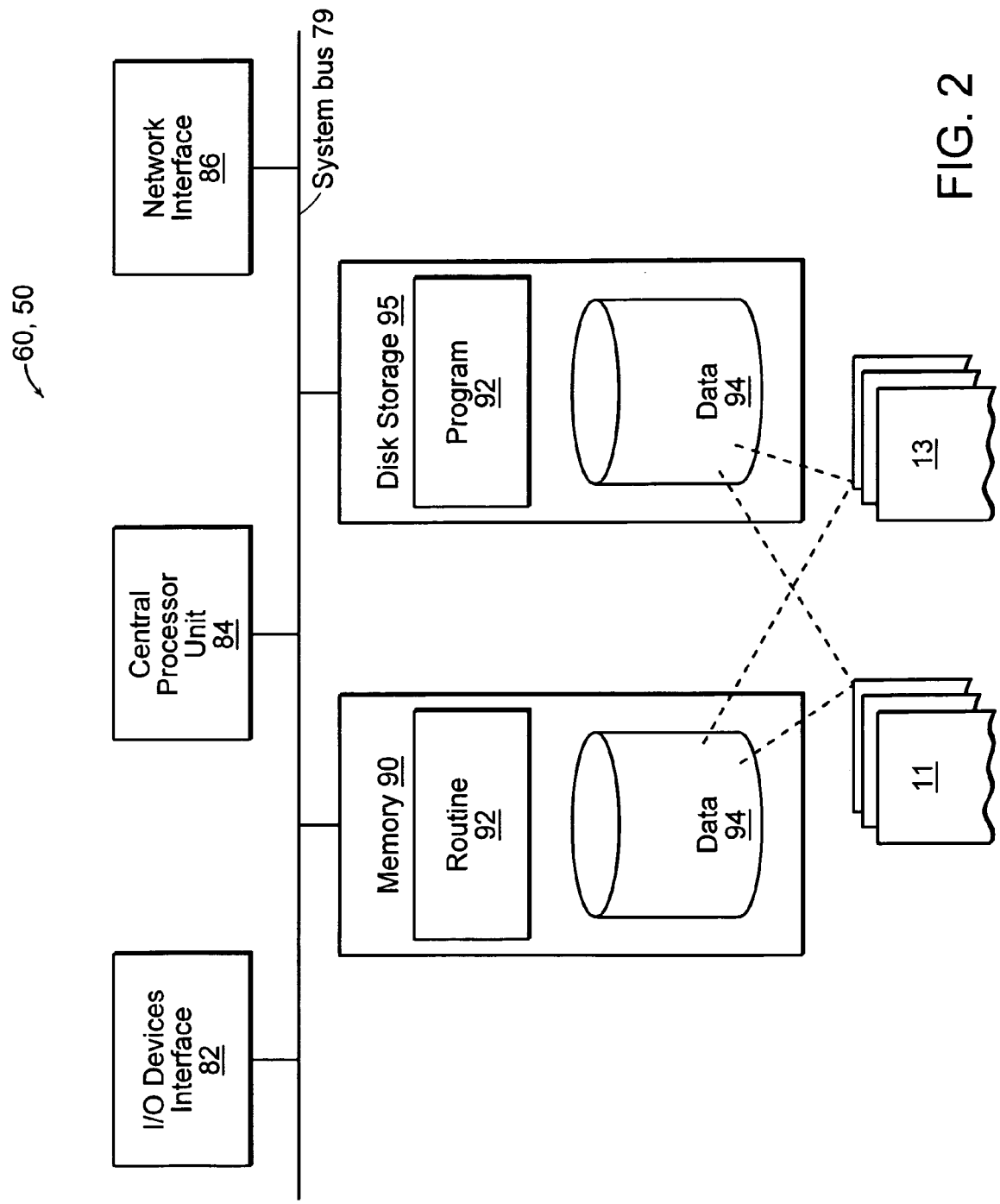
FIG. 2 is a block diagram of a computer from one of the nodes of the network of FIG. 1.

FIG. 2 is a diagram of the internal structure of a computer (e.g., client processor/device 50 or server computers 60) in the computer system of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions used to implement an embodiment of the present invention (e.g., Program Routines 92 and Data 94, detailed later). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

In the preferred embodiment, data 94 includes student records 11 and a curriculum data store formed of a set 13 of teaching activities for incorporating into lesson plans. Both the student information of the student records 11 and the teaching activities of curriculum records 13 are organized according to the present invention domain areas of communication, academics, social skills, leisure/recreation (generally fitness), vocational, self help, health and behavior to reduce. For each domain area, there is a predefined set of skills, a subset of which are a core set of skills that Applicants have identified as necessary for independent functioning.

An example of the skills in the communication domain includes: expressive language, expressive vocabulary, receptive language, receptive vocabulary, skills for following directions and the like. Core skills for the communication domain preferably include: requesting items; gaining attention; making choices among visually presented items; requesting to stop; stating yes/no; requesting help; following directions; one-step directions; responding to "stop"/"come"; following instructions from a distance; responding to name; receptive identifying of body parts, objects, pictures, familiar people and objects; using expressive vocabulary; expressive identifying of objects, pictures, familiar people and objects.

An example of the skills in the academics domain includes: math, spelling, reading, etc. Core skills include: attending to the speaker; matching objects, photos/pictures, picture to object and object to picture; discriminating; and scanning and looking.

An example of the skills in the self-help domain includes: domestic cleaning, hygiene maintenance skills, dressing oneself, eating skills and the like. Core skills include: dressing, washing, showering, tooth brushing, chewing food, eating with utensils, eating various foods, drinking from a cup, toileting, stopping when directed, exiting given a fire alarm, wearing a seat belt (riding in car/vehicle), tolerating medical procedures, taking medication and identifying self.

An example of the skills in the leisure/recreation domain includes: exercise, community recreation, hobbies, etc. Core skills include: gross motor, walking independently, exercising, walking in the community, following a schedule (picture schedule, written schedule), age appropriate leisure skills and leisure activities.

An example of the skills in the vocational domain includes: custodial, clerical, food service, etc. Core skills include: maintaining appropriate appearance and greeting others.

An example of the skills in the social skills domain includes: appropriate behavior, social interaction and reducing maladaptive behavior. Core skills include: increasing appropriate social behavior, compliance, waiting, choice making, using functional language alternatives, establishing preferences, using conditioned reinforcers, decreasing inappropriate social behavior, social/sexual behavior, privacy (personal hygiene, sexual behavior, personal space), eye contact (in response to name, while engaged in activity, from a distance and during group instruction), group participation, imitation, one-step gross motor, actions with objects, sequenced gross motor, sequenced actions with objects, and age related independent play.

An example of the skills in the health domain includes: safety, growth and development and physical fitness. Core skills include: tolerating medical procedures and personal privacy.

Students are assessed on the core set of skills per domain area and lesson plans are made according to assessed skill level as will be further discussed below. Preferably an initial assessment and ongoing assessments are utilized with assessment results indicated or otherwise recorded in student records 11. Assessment results may include comments by parents, government worker input/feedback and the like in addition to educators. In one embodiment, the student records 11 are formed and formatted as follows.

For a given student, the corresponding student record 11 has (a) a general information section, (b) a lesson (past and current) tracking section, (c) a skill level section and (d) a learning profile portion. The general information section provides the student's name, age, address and other general information. The lesson tracking section provides summaries of both past and current lessons. For past lessons, a lesson history section is arranged chronologically and sets forth descriptions of lessons (including curriculum content, teaching activities or exercises), corresponding performance outcome of each lesson session or trial (e.g., skill introduced, skill mastered, . . . ), number of times the lesson/teaching activity was repeated before the skill was mastered, and the like.

The skill level section of a student record 11 provides an indication of assessed skill level (from the initial and ongoing assessments by educators) in each domain area. That is for a given domain, this section of the student record 11 indicates skill development level in each of the skills of the core set of skills in the domain. Preferably, skill development level is indicated along a continuum or range, for example, skill introduced, skill practiced and skill mastered. As such, the present invention enables, per student, identification of which core skills need what level of attention (introduction, practice and/or mastery) in each domain.

The learning profile portion of a student record 11 includes indications of student preferences (as observed by educators), learning patterns, past performance, techniques liked or disliked by the student and similar information, in general or per domain. These aspects and indications are especially helpful in teaching individuals with autism or students with learning disabilities.

The data set (records) 13 of teaching activities in the preferred embodiment is referred to as a curriculum data bank 13. As mentioned above, the curriculum records (teaching activities) 13 are organized or categorized by domain. For each domain, there is a respective age appropriate set of skills to be taught to and/or mastered by the student. Thus curriculum/activity records 13 are further subcategorized by applicable age.

For each of the different skills, the curriculum records/data store 13 provide teaching activities that introduce the skill, teaching activities that practice or develop the skill and teaching activities that assist with mastering the skill. For example, introductory teaching activities for expressive language skills in the communications domain may be (1) obtaining the student's attention, (2) vocal imitation and (3) following a point by looking at an item. An example activity of the next level of development of the expressive language skills may be orally naming objects in the environment to express identification of objects. The sets of skills and activities directed to the same meet government curriculum standards and industry best practices and standards. More importantly, the teaching activities and corresponding sets of skills across the various domains address development of the "whole person" from preschool to adult stages unique to the present invention.

Preferably there is one teaching activity per record 13, and the record provides step by step instructions for implementing or carrying out the teaching activity. The step by step instructions follow best practices and industry approved methodologies (such as using principles of Applied Behavior Analysis in the case of autistic students). Alternative implementations for the subject teaching activity may also be provided. For example, a record 13 provides step by step instructions for teaching a student to drink from a cup. The standard step by step instructions use visual modeling. The alternative implementation in the record 13 provides step by step instructions that use manual guidance. A third implementation for the subject teaching activity/record 13 provides step by step instructions based on another technique approved in the industry.

In addition to skill development level (introductory, practice, mastery), the teaching activities/records 13 within the curriculum data bank may be further subcategorized by level of abstractness. For example, in the set of records 13 that provide teaching activities for obtaining adeptness of a skill, there are some records that provide teaching activities which enable a more abstract grasp of the skill (less tied to environment or context). The teaching activities which provide the skill independent of environment or context may be considered to be more difficult and reserved for the mastery stage of learning the skill. Level of abstraction and environmental or contextual influence are unique to teaching individuals with autism and individuals with certain learning disabilities.

In the preferred embodiment, respective relational databases are used to implement the data store of student records 11 and the curriculum data bank 13. A portable programming language such as Javascript or other programming language may be employed. The curriculum data store records 13 are indexed by domain, applicable age, core skill and skill development level. The student records 11 are configured to provide (a) assessed skill level per core skill, per domain and (b) age of student, in a manner that enables cross correlation (query) into the curriculum data store/records 13 to extract pertinent teaching activities records 13. Further, the teaching activities/curriculum records 13 within a same core skill and same development level may be serially or hierarchically ordered (for example by linked lists, or the like). Similar ordering across development levels (from an introductory series of teaching activities to the practice series of activities to the mastery series of a given skill) may be employed. Likewise ordering or sequencing of skills (and hence corresponding teaching activities) within a domain may be employed. Such addresses the sequence of skills to be taught specific to certain learning disabilities like autism.

Figure 4A:
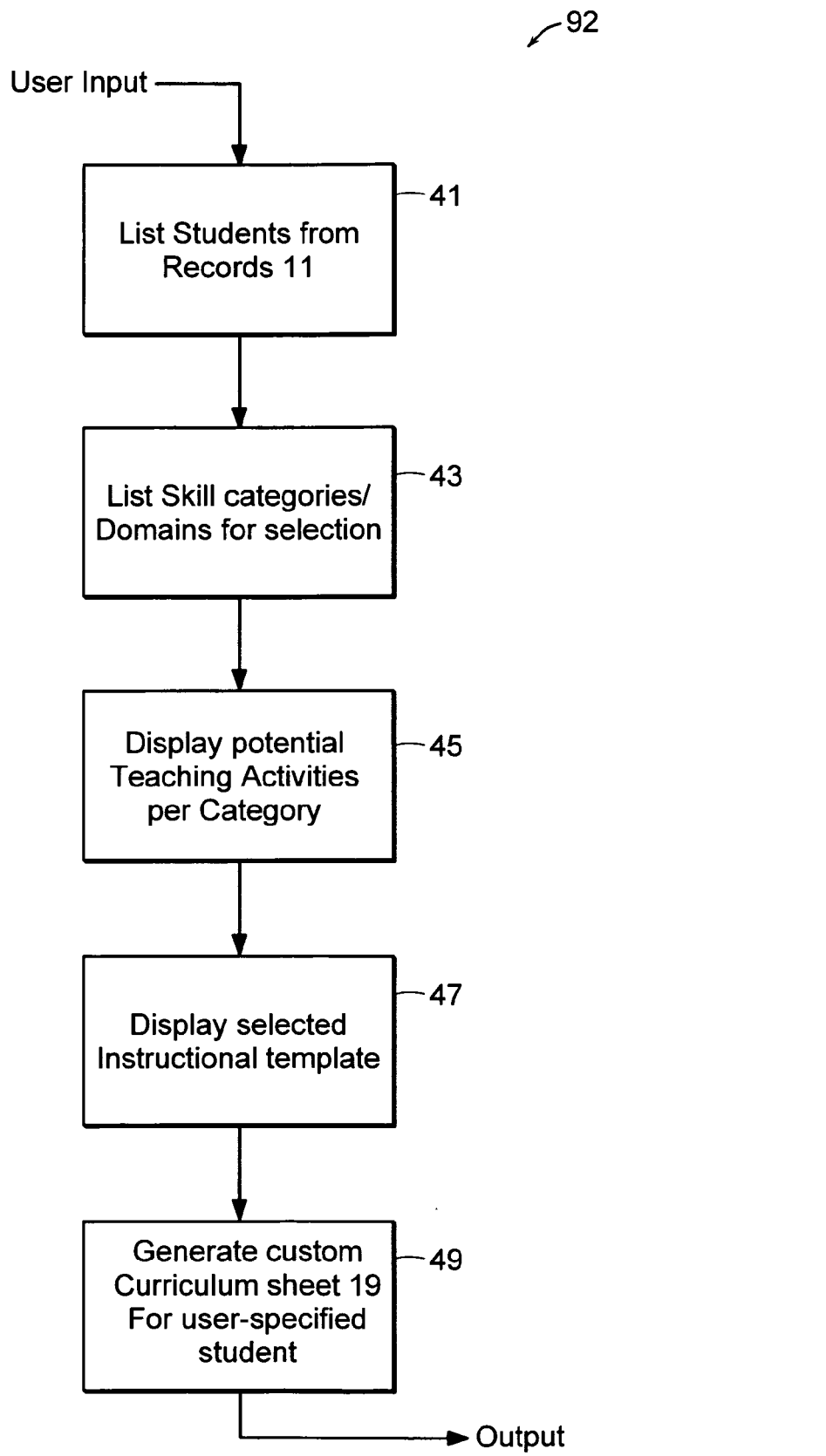
FIGS. 4a-4b are flow diagrams of one embodiment of the present invention software with respect to a teacher-user.

Returning to FIGS. 1 and 2, the present invention computer system 50, 60 provides a tool for an educator to custom design lesson plans for each given student. The flow of computer program 92 control supporting the tool during educator-user use is outlined in FIG. 4a and discussed next. The tool (via computer program/processor routine 92, step 41) displays a list of student names from student records 11. From that list, the educator-user selects a particular student from the data store of student records 11.

Next at step 43, invention routine 92 enables the educator to select a domain (skill set) to be addressed in the current lesson plans being formulated for the subject student. Based on the selected domain, the invention routine 92 looks up the student's assessed skill level in each of the identified core skills for that domain as stored in the subject student's record 11. Routine 92 displays the identified core skills (in the selected domain) for the subject student. Upon user selection or indication of one of these core skills to be addressed in the current lesson plan, processor routine 92 at step 45 obtains various skill development level appropriate and age appropriate activities (records) from the curriculum data bank 13.

Next, invention routine 92 displays or otherwise provides a list or set of pertinent teaching activities from the obtained curriculum records 13, from which the educator-user may make a selection. The invention routine 92 displays prerequisites of a selected teaching activity, step-by-step implementation instructions and an indication of materials for implementing the activity, as well as criteria for progressing with the activity or increasing/decreasing level of the activity.

Here the educator-user may read/review, from the lesson history section of the selected student record 11, the student's prior lessons attempted and accomplished. The educator-user may also read/review from student records 11 the learning profile (learning preferences) of the subject student. With such information at the educator-user's fingertips, the educator-user may more easily determine which implementation alternative (of the selected teaching activity 13) is more suitable (a best fit) for the subject student. Following the prior example of the teaching activity record 13 in which one implementation uses visual modeling and an alternative implementation uses manual guidance, the educator-user may see from the student's record 11 (learning profile and lesson history sections) that the subject student had success in mastering a skill in another domain when manual guidance was used. Thus the educator-user may select the alternative implementation with manual guidance for the current teaching activity record 13. In this way, the lesson plan being currently formulated with selected teaching activity record 13 is customized/individualized for the subject student based on recorded past performance and learning profile.

Further, from the lesson history section of the subject student record 11, the educator-user can see that the subject student has, for example, completed one or many introductory activities, i.e., exercises/activities that introduce the subject skill. Thus the educator-user can select, for the current lesson plan, a next development level (or appropriate development level) activity that addresses the skill. Or there may be several such next level activities for the educator-user to consider as displayed through curriculum data bank records 13. The educator-user can contemplate a series of lesson plans, each lesson plan utilizing a different one of those teaching activities from records 13, and each record offering an alternative implementation which may be more aligned with the subject student's learning style than the standard implementation as discussed above. The present invention data store of teaching activity records 13 in combination with student record information (e.g., lesson history, learning profile, etc.) 11 enables such student focused, individualized and customized planning of lessons.

In embodiments where a series of teaching activities/records 13 is defined per domain, then the assessment indications (per domain) in the student record 11 effectively provides a query into the respective activity series. The query results provide an indication of portion of the series of teaching activity records 13 that is appropriate for the current lesson plan in the making. Other query engines, rule engines and the like may be employed to determine appropriate curriculum records 13, for the current lesson being planned, as a function of student record 11 indications of assessed skill levels.

Further, lesson plans in one domain area for a given student do not unduly restrict or dictate lesson plans in another domain for that student. That is, the present invention allows flexibility between lesson plans and respective exercises (activities) of different domain areas per student. This is in recognition that learning disabled individuals (especially individuals with autism) often may learn skills in one domain area at a different rate than skills in other domain areas. Again, the present invention organizes student information in student records 11 and teaching activities of curriculum data store 13 by domain, core skill and skill level for purposes of enabling and guiding educators to form appropriate customized lesson plans for each student.

In other embodiments, curriculum records 13 provide audio-visual (video) demonstrations of the respective exercise. Other information or views of the corresponding exercise may also be provided and displayed upon selection by the educator-user.

Figures 3, 3A:
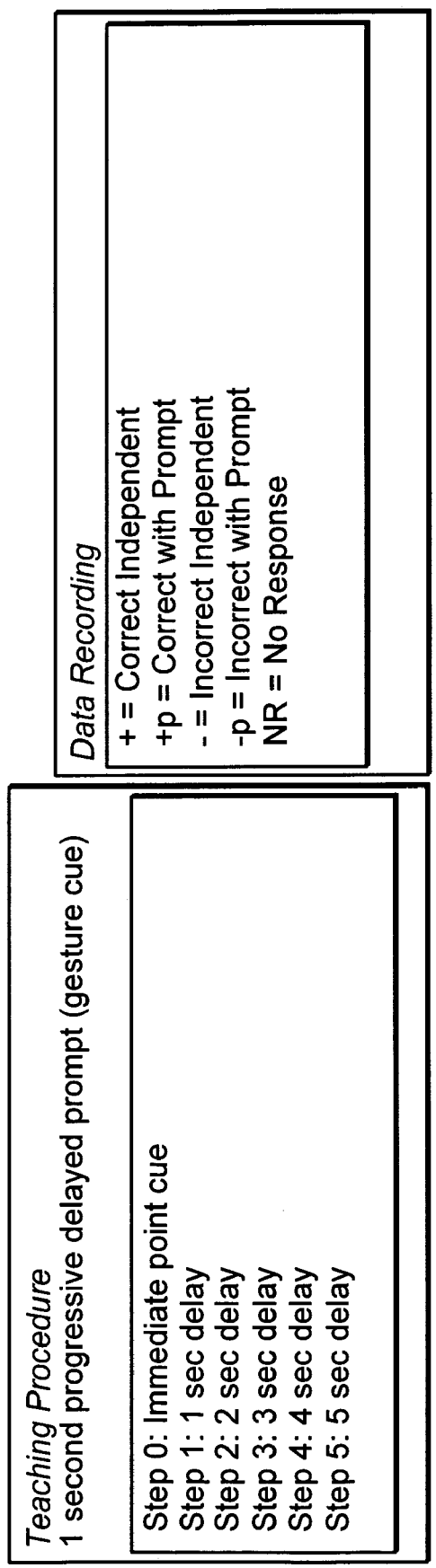

The user selected teaching activity unit/curriculum record 13 is copied to form an instructional template for the subject student (step 47). The educator-user may refine the formed instructional template knowing other lesson plans with respective activities are in progress (as indicated in student records 11). Once the educator-user is satisfied with the working instructional template 47, program 92 (step 49) is responsive to the educator-user command to output the custom made lesson plan. In the preferred embodiment, the output includes a custom curriculum sheet 19 designed for the educator to use during implementation of the custom lesson plan with the subject student. FIGS. 3a and 3b illustrate such a custom curriculum sheet 19 (detailed later).

It is understood that various decision support engines or subsystems may be employed. Such a subsystem would be responsive to user input at each step 41, 43, 45 and provide refined options for selection at a succeeding step based on information in curriculum records 13 and student records 11.

Referring to Fib. 4b, in step 35 the invention routine 92 may hold the custom made lesson plan (curriculum sheet 19) of step 49 for approval before output and use by the educator-user. An administrator-user, such as a supervisor, reviews the subject lesson plan through routine 92. Upon supervisor approval of the lesson plan (step 37), routine 92 releases the lesson plan and allows output of the curriculum sheet 19 to an educator-user for use as described above.

Figure 5:
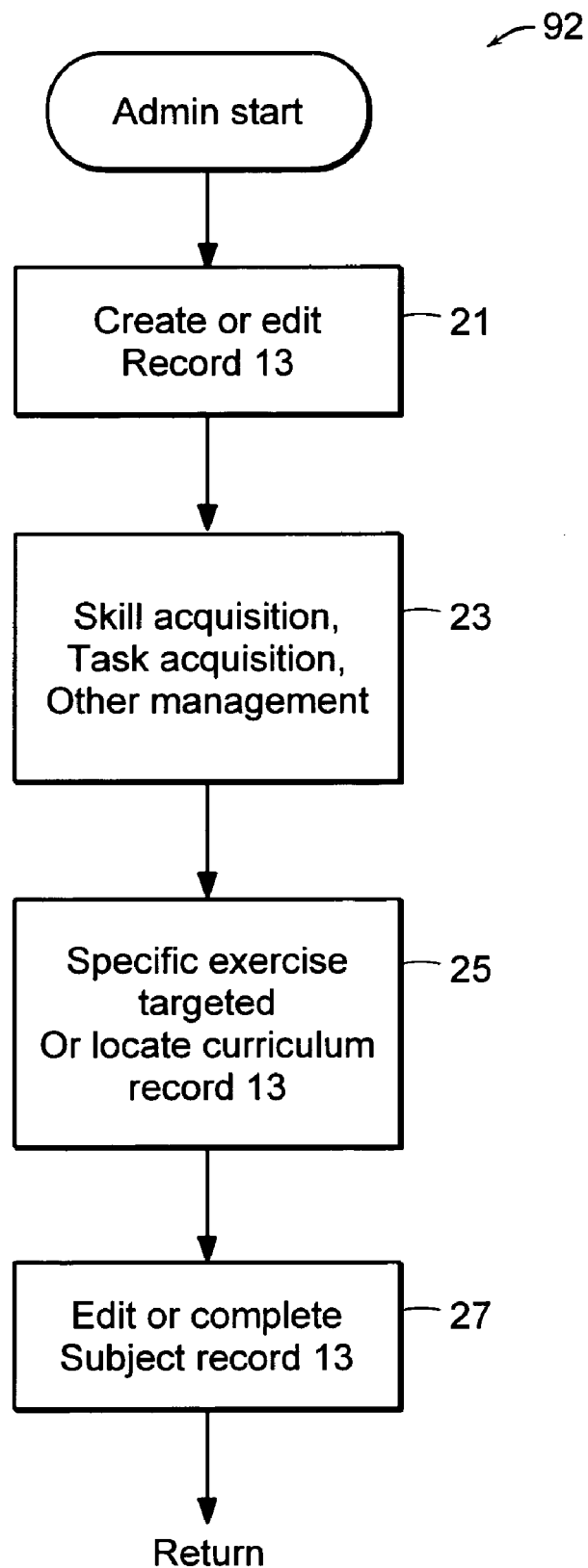
FIG. 5 is a flow diagram of the embodiment of FIGS. 4a-b with respect to an administrator-user.

The prerequisites and criteria for the selected teaching activities in step 45 (FIG. 4a) are set in advance by content experts of the present invention as illustrated in FIG. 5. In the flow diagram of FIG. 5, the administrative user creates or edits records in the curriculum data bank 13 as follows. In step 21, the content expert selects to create or edit a curriculum (activity) record 13. In step 23, the user selects skill acquisition, task or other category of management/program administration. In step 25, the content expert selects or specifies teaching activity, in the selected category, for which he desires to define or edit the definition of. In step 27, the content expert edits or completes the record 13 of the subject teaching activity. This includes specifying the prerequisites, materials needed to implement the activity, alternative implementations and criteria for progressing with the activity or increasing or decreasing the level of the activity. Also in step 27 the content expert specifies cross references between the skill category (domain and/or core skill) for this teaching activity and other activities in the curriculum data bank records 13.

The foregoing settings are then reflected in screen views displayed (and output 19 rendered) to the teacher user in response to her utilizing the present invention system as described above in FIGS. 3a, b and 4a, b. As can be seen in the sample curriculum sheet 19 of FIGS. 3a and 3b, a day's lesson plan (with certain teaching activity) for the example student "Fitch Abercrombie" is provided. In the example, the curriculum sheet 19 specifies for the teacher materials required for the lesson and suggests prerequisites of the student. Initial assessment procedures as well as step-by-step activity instructions and procedure are also detailed on the curriculum sheet 19. "Grading" or marking instructions are also provided on the curriculum sheet 19, including criteria for increasing/decreasing step, criteria for help/revision, criteria for increasing level along with corresponding descriptions of each level and criteria for mastery.

Accordingly, a teacher (educator) generates different custom curriculum sheets 19 (i.e., lesson plans with teaching activities tailored to the student) for different skills to be introduced/practiced by a subject student. Collectively the many customized activity/curriculum sheets 19 form a custom student program. As such the present invention enables educators (teachers and administrators) to prepare custom lesson plans per student throughout a school or educational program. Further, where the lesson plans (past and current) are stored in connection with student records 11, the present invention enables various reporting of the same (especially with IEP reports). In a preferred embodiment, a reporter routine is coupled across invention program data 94 to gather fields of data necessary for IEP reports and to generate therefrom report documents in the necessary governmental or other agency formats. Other reports by groups of students, by particular curriculum (exercise or activity set), for performance, measured effectiveness and the like are made possible by the present invention student records 11 and curriculum records 13. Such data access, formatting and report generation are accomplished by known techniques in the art.

Where the invention program 92 is run on computers 50, 60 in communication with a global network 70, routine 92 allows linking to government agency websites for reporting student information and lesson plan data. Data gathering (uploading) to the student records 11 may be by remote wireless devices (e.g., hand held data communication devices) and the like. Other communications and network linking through invention 92 are also in the purview of one skilled in the art.

Another feature of the present invention system is that the progress or other reporting of performance of each lesson (implementation session) is enabled. As the teacher uses the generated curriculum sheet 19 to give a lesson, the teacher makes notes of the student's response. These responses are entered into the student record 11 (specifically at the current lesson section of the record 11). FIG. 6 illustrates the student record table 31 used in the preferred embodiment. This table 31 keeps a running tally of the student's trials, an indication of who taught the lesson, the date and time and location of the lesson, etc. Many of these aspects are factors in the learning pattern of an autistic student or a student with learning disabilities.

In the field of education for autistic students, this type of tracking of lessons is important. Autistic students do not adapt to changes well. Thus environment, teacher, location of the lesson, etc. impact learning and thus progress on each teaching activity or subject skill.

Figure 4B:
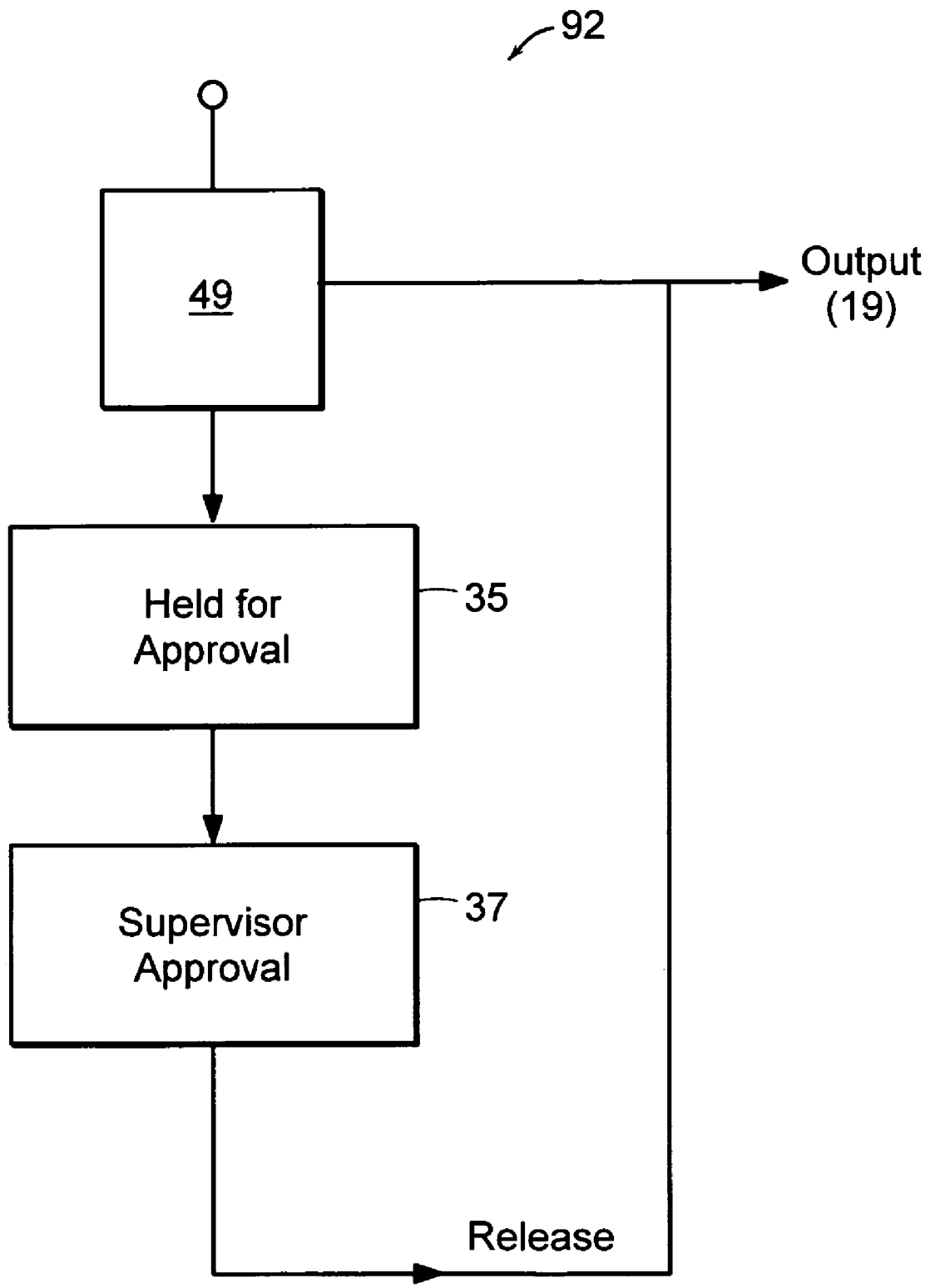

Administratively, student record table 31 may be used as a mechanism or point of process control in the invention system 92. For example, a home specialist or teacher may initially indicate that trials are being halted on a certain teaching activity or set of activities in table 31. System 92 responds by placing the corresponding lesson plan on hold 35 and pending approval loop as discussed in FIG. 4b. A supervisor and/or administrator may log onto this system 92 and review table 31. The administrator may then research or appropriately follow up on the surrounding circumstances to determine whether such halting is warranted. If so, the administrator and teacher alike may modify the student's lesson plan accordingly. Alternatively, system 92 may automatically trigger a notice to a supervisor/administrator after a predetermined number of trials have been halted and recorded as such in table 31. Other administrative controls can similarly be implemented through table 31 and the hold-approval loop of FIG. 4b.

In one embodiment, routine 92 provides a next lesson plan or curriculum sheet 19 for a given student based on the progression made within one teaching activity level and from one level to the next as documented in the corresponding student record 11 (e.g., table 31). As pertinent fields of table 31 are completed, routine 92 determines level of progress made by the subject student in the corresponding skill. Based on this determination and the ordering of teaching activities/records within the curriculum data bank 13 per domain and skill, routine 92 makes a preselection of next activity and level of activity and displays this in a proposed next lesson plan/curriculum sheet 19.

While this invention has been particularly shown and described with references to preferred embodiments thereof, it will be understood by those skilled in the art that various changes in form and details may be made therein without departing from the scope of the invention encompassed by the appended claims.

For example, different educators from different areas of concern (e.g., occupational therapy, general scholastic, health, maintenance/hygiene, etc.) will use the invention tool to prepare custom lesson plans for the same subject student. The different skills domains and teaching activity levels of the present invention 92 are supportive of this team teaching approach which cannot be as effectively achieved in the prior art generic lesson plan making systems. Further, the cross-referencing of teaching activities or records within the curriculum data store 13 assists with the lesson planning by multiple teachers and monitoring by administrators.

What is claimed is:

1. A computer system for generating educator lesson plans customized per student, comprising:

in computer memory, a data store of teaching activity records and respective teaching activities, each teaching activity record including step-by-step teaching instructions enabling educator-user implementation of a respective activity that addresses a certain skill, the step-by-step teaching instructions being other than student testing instructions and comprising instructions for the educator-user's use to progress with the teaching activity, the teaching activities of the teaching activity record being configured to develop each activity relating to a respective skill at a certain skill level, different activities relating to development of different skills at different skill levels, to allow for varying levels of learning across domain areas of academics, life skills and social skills;

a student information module coupled to the memory and configured to hold, for each student, a set of student information including assessed skill level in each of the domain areas, the assessed skill level being based on an initial skill assessment and on going skill assessments of skills in the domain areas, such that using the assessed skill level, the student information module effectively identifies a core set of skills needed for independent functioning of the student;

a processor operatively coupled to the memory, the processor configured to execute a routine, the routine being responsive to educator-user interaction and (i) determining, for a subject student, a subset of teaching activities in the data store as a function of assessed skill level and corresponding identified core set of skills per domain area for the subject student from the student information module, (ii) selecting at least one of the teaching activities in the determined subset, (iii) for the selected at least one teaching activity, generating one set of step-by-step teaching instructions enabling educator-user implementation of a respective activity individualized to the subject student, wherein the routine forms the one set of step-by-step teaching instructions by generating instructions how to implement the respective activity with visual modeling where the student is a visual learner and alternative instructions how to implement the respective activity with manual guidance, (iv) generating from the one set of step-by-step teaching instructions, an educator lesson plan customized for the subject student and individualized to the subject student's varying levels of learning across different domain areas and across different skills per domain area, the routine modifying the step-by-step teaching instructions for the educator lesson plan to be modified as a function of other lesson plans in progress and the routine using the subject student's performance from the one set of step-by-step teaching instructions to generate a next set of step-by-step teaching instructions for a next developmental level, wherein the teaching activity records are serially or hierarchically ordered within a same skill and same skill level, as well as serially or hierarchically ordered across skill levels, and wherein the corresponding teaching activities of the teaching activity record are ordered or sequenced within domain areas; and (v) outputting to the educator-user the customized and individualized educator lesson plan, the educator lesson plan being customized and individualized in subject matter content and teaching instructions; and a lesson progress reporting module tallying running trials and progress of the subject student on the one set of step-by-step teaching instructions implementing respective teaching activities in the customized educator lesson plan, the lesson progress reporting module being coupled to the processor and triggering a next set of step-by-step teaching instructions according to the criteria for progressing with the respective teaching activity.

2. A computer system as claimed in claim 1 wherein the domain areas include categories of communication, academics, social skills, leisure/recreation, vocational, self-help, health and reduction of maladaptive behavior.

3. A computer system as claimed in claim 1 wherein the skills addressed by the teaching activities of the data store range from skills for children through skills for adult functioning.

4. A computer system as claimed in claim 1 wherein the set of information for each student further includes indications of past and current lesson plans and student performance of corresponding lesson sessions, such that the student information provides a running history of skill development of the student; and the processor routine allows display of the set of student information during user selection of the at least one teaching activity, in a manner enabling user consideration of the running history of skill development of the student, during selection of a teaching activity and subsequent generation of the lesson plan based thereon.

5. A computer system as claimed in claim 4 further comprising a reporter coupled to the student information module and enabling aggregation and output of (i) student performance data across plural students, (ii) student performance data per skill, and/or (iii) student performance data per teaching activity.

6. A computer system as claimed in claim 1 wherein the set of student information further includes a learning profile of the student indicating learning preferences of the student; and the processor routine providing display of the learning profile during user selection of the at least one teaching activity such that said user selection is guided by the learning profile of the student.

7. A computer system as claimed in claim 6 wherein the indicated learning preferences are per domain area.

8. A computer system as claimed in claim 1 wherein for each teaching activity the data store provides step-by-step teaching instructions for implementing the activity.

9. A computer system as claimed in claim 8 wherein for each teaching activity the data store provides at least one alternative implementation and respective step-by-step teaching instructions for each alternative implementation; and the processor routine further enabling user selection of an alternative implementation and generating therefrom the lesson plan customized and individualized for the subject student.

10. A computer system as claimed in claim 1 wherein the processor routine enables user selection of a series of teaching activities in the data store and generates therefrom a series of lesson plans customized and individualized for the subject student, a series of lesson plans within a domain area providing a continuum of introduction, practice and mastery of the one or more skills in the domain area, a series of lesson plans across the domain areas accommodating skill development at different rates for different domain areas.

11. A computer system as claimed in claim 1 wherein the processor routine further provides suspension of the customized and individualized lesson plan pending supervisory approval.

12. Computer apparatus for generating educator lesson plans customized per student, comprising:
   a data store of skill oriented activity records and respective teaching activities, each activity record specifying step-by-step teaching instructions enabling educator-user implementation of a respective activity that addresses a certain skill at a certain skill level, the step-by-step teaching instructions being other than student testing instructions and comprising instructions for the educator-user's use to progress with the teaching activity, different activities addressing different skills at different skill levels, to allow for varying levels of learning across domain areas of academics, life skills and social skills;
   for each student, a student record holding the student information including:
   (i) a learning profile of the student, and
   (ii) information regarding skill level of the student; and
   a processor routine responsive to educator-user interaction and (a) identifying a core set of skills needed for independent functioning of a subject student using the student record, (b) selecting an activity from the data store of activity records based on the student information of the subject student and the identified core set of skills, (c) generating from the selected activity an educator lesson plan including generating one set of step-by-step teaching instructions enabling educator-user implementation of a respective activity but specific to the subject student, the generated set of teaching instructions customizing the educator lesson plan to the subject student and individualizing the educator lesson plan to the subject student's varying levels of learning across different domain areas and across different skills per domain area, the processor routine enabling the step-by-step teaching instructions for the educator lesson plan to be modified as a function of other lesson plans in progress and the processor routine using the subject student's performance from the one set of step-by-step teaching instructions to generate a next set of step-by-step teaching instructions for a next developmental level, wherein the teaching activity records are serially or hierarchically ordered within a same skill and same skill level, as well as serially or hierarchically ordered across skill levels, and wherein the corresponding teaching activities of the teaching activity record are ordered or sequenced within domain areas, and (d) outputting to the educator-user the customized and individualized educator lesson plan and set of teaching instructions; and
   a lesson progress reporting module tallying running trials and progress of the subject student on the one set of step-by-step teaching instructions implementing respective teaching activities in the customized educator lesson plan, the lesson progress reporting module being coupled to the processor and triggering a next set of step-by-step teaching instructions according to the criteria for progressing with the respective teaching activity.

13. Computer apparatus as claimed in claim 12 wherein each activity record provides at least one alternative implementation for the respective activity, each alternative implementation being specified by a respective set of step-by-step teaching instructions for carrying out the activity.

14. Computer apparatus as claimed in claim 12 wherein the learning profile in the student information includes indications of learning preferences of the student; and
   the processor routine provides display of the indications of the learning preferences during educator-user selection of an activity, such that said selection is made with guidance of the learning preferences of the student.

15. Computer apparatus as claimed in claim 12 wherein the student information further includes indications of past and current lesson plans and outcomes of corresponding lesson experiences, such that a running history of skill development of the student is provided; and
   the processor routine allows display of the student information during educator-user selection of an activity, in a manner that enables educator-user consideration of the running history of skill development of the student during generation of the customized and individualized lesson plan.

16. Computer apparatus as claimed in claim 15 further comprising a reporter coupled to the student records and enabling aggregation and output of (i) student performance data across plural students, (ii) student performance data per skill, and/or (iii) student performance data per teaching activity.

17. Computer apparatus as claimed in claim 12 wherein the information regarding skill level of the student includes information from an initial assessment and from on-going assessments of the student's skill level.

18. Computer apparatus as claimed in claim 12 wherein the skills addressed by the activities of the activity records are organized according to domain areas of communication, academics, social skills, leisure/recreation, vocational, self-help, health and maladaptive behavior.

19. Computer apparatus as claimed in claim 18 wherein the learning profile and/or the information regarding skill level are organized according to the domain areas.

20. Computer apparatus as claimed in claim 18 wherein the information regarding skill level is based on initial and on-going skill assessments in each of the domain areas, and identifies a core set of skills in each domain area needed by the student for independent functioning; and
   the processor routine determines, for the subject student, a subset of activities in the data store as a function of identified core set of skills in a given domain area, the activities in the determined subset being selectable by the educator-user for use in generating the customized and individualized lesson plan for the subject student.

21. Computer apparatus as claimed in claim 18 wherein the processor routine further enables generation of lesson plans that allow development of skills in different domain areas at different rates.

22. Computer apparatus as claimed in claim 12 wherein the skills span childhood skills through adulthood skills for independent functioning.

23. Computer apparatus as claimed in claim 12 wherein for each skill there are activities for introducing the skill, activities toward practicing the skill and activities for mastering the skill.

24. Computer apparatus as claimed in claim 12 wherein the processor routine further provides suspension of the customized and individualized lesson plan pending supervisory approval.

25. Computer apparatus for customizing educator lesson plans per student, comprising:
   a curriculum data store holding a plurality of curriculum records, each record indicating a respective activity configured for development of different skills at different skill levels to allow for varying levels of learning across domain areas of academics, life skills, and social skills and including implementation details of the activity as part of an educator lesson plan, each activity including step-by-step teaching instructions enabling educator-user implementation of a respective activity that addresses a certain skill, the step-by-step teaching instructions being other than student testing instructions and comprising instructions for the educator-user's use to progress with the teaching activity;

a processor routine coupled to the curriculum data store and responsive to user interaction, for a given student, the processor routine: (i) selecting a curriculum record with its respective activity as a function of at least one of assessed skill level and learning preferences of the given student together with an identified core set of skills needed for independent functioning of the given student, (ii) generating a custom educator lesson plan including one set of step-by-step teaching instructions individualized for the given student, said generating including generating instructions how to implement the respective activity with visual modeling where the student is a visual learner and alternative instructions how to implement the respective activity with manual guidance, the processor routine modifying the step-by-step teaching instructions for the custom educator lesson plan as a function of other lesson plans in progress, the custom educator lesson plan including the activity of the selected curriculum record and being individualized to the given student's varying levels of learning across different domain areas and across different skills per domain area, the processor routine using the subject student's performance from the one set of step-by-step teaching instructions to generate a next set of step-by-step teaching instructions for a next developmental level, wherein the teaching activity records are serially or hierarchically ordered within a same skill and same skill level, as well as serially or hierarchically ordered across skill levels, and wherein the corresponding teaching activities of the teaching activity record are ordered or sequenced within domain areas, and (iii) outputting the custom educator lesson plan as customized and individualized in subject matter content and teaching instructions specific to the given student; and a lesson progress reporting module tallying running trials and progress of the given student on the one set of step-by-step teaching instructions implementing respective teaching activities in the custom educator lesson plan, the lesson progress reporting module being coupled to the processor and triggering a next set of step-by-step teaching instructions according to the criteria for progressing with the respective teaching activity.

26. Computer apparatus as claimed in claim 25 wherein each curriculum record provides any combination of an indication of materials required, an indication of prerequisites and an audio-visual demonstration of the respective activity.

27. Computer apparatus as claimed in claim 25 wherein each curriculum record indicates criteria for increasing level of the activity; and wherein the respective activity is formed of a plurality of steps, the curriculum record further includes criteria for increasing step and decreasing step.

28. Computer apparatus as claimed in claim 27 wherein the processor routine further enables administrative users to define the criteria.

29. Computer apparatus as claimed in claim 25 further comprising a student record data store holding student information including current and past lesson plans used for each student, outcomes of the lesson plans providing indications of skill level and learning preferences of students; and the processor routine being coupled to access the student record data store.

30. Computer apparatus as claimed in claim 29 wherein for each student there is a respective student record in the student record data store, each student record indicating any combination of:

number of trials of an activity,
level of mastery of skill corresponding to the activity,
date and times of trials,
location of trials, and
teacher of each trial.

31. Computer apparatus as claimed in claim 29 further comprising a reporter coupled to the student record data store, the reporter enabling aggregation and output of (i) student performance data across plural students, (ii) student performance data per skill, and/or (iii) student performance data per teaching activity.

32. Computer apparatus as claimed in claim 25 wherein the processor routine further provides suspension of the customized lesson plan pending supervisory approval.

* * * * *